United States Patent Office 3,657,402
Patented Apr. 18, 1972

3,657,402
CASTING TUBULAR REVERSE OSMOSIS
MEMBRANES IN PLACE
Regis R. Stana, Murrysville, and Andrew S. Calderwood, Monroeville, Pa., assignors to Westinghouse Electric Corporation, Pittsburgh, Pa.
Filed Apr. 15, 1970, Ser. No. 28,603
Int. Cl. B29d 23/08, 27/04; C08b 29/10
U.S. Cl. 264—45
14 Claims

ABSTRACT OF THE DISCLOSURE

An open pore module, of bonded resin coated filler particles, having a plurality of spaced bores therethrough containing reverse osmosis membranes, is made by (1) placing the module in a stationary vertical position, (2) placing a viscous casting solution containing polymeric film forming material, a solvent and a leachable swelling agent into each of the bores, (3) gravity dropping a casting bob, having a circular cross-section at its widest point with an outside diameter between 0.02 and 0.12 inch less than the inside diameter of the module bores, at a speed less than 1 inch/sec. down through each bore to form a continuous film of casting solution on the inside of each bore, (4) exposing the film to air and then (5) contacting the film with a leaching liquid to form a reverse osmosis membrane on the inside of each module bore.

BACKGROUND OF THE INVENTION

This invention relates to an improved method of casting unitary, tubular, semipermeable membranes in place in the feed bores of a support module made of bonded, resin coated filler particles, for use in reverse osmosis fluid purification systems.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

A reverse osmosis system has application in many areas. The areas of greatest present interest are making potable water from brackish or polluted water and cleaning up waste streams. Other applications are taste improvement of potable but objectionable water, softening of municipal waters, water sterilization and the concentration of food (orange juice, tomato juice, cheese whey, and syrups).

Reverse osmosis fluid purification systems have taken on many forms including plate and frame, hollow fine fiber, spiral wound and tubular types. The configuration which appears to have the greatest commercial appeal at the present time is the tubular type reverse osmosis system. The tubular type system employs a semipermeable reverse osmosis membrane in the form of a long straight tube containing an active osmotic skin. This membrane is generally inserted and sealed inside a pressure containing structure, so that the fluid to be purified can be contained inside the membrane tube under pressure. The preferred tubular membranes are of unitary construction, i.e., the membrane is one continuous piece of material and does not have to be rolled and glued to form a tube.

In the present state of the art, tubular type reverse osmosis water purification systems are constructed by casting the membrane separately, curing it in hot water, inserting the membrane in a porous pressure containing module, such as a fiberglass tube with holes drilled through it, and then sealing the membrane to the module as well as to a feed header. This method has both an inherent high cost and time factor associated with it especially when multibore modules are used.

SUMMARY OF THE INVENTION

Our method provides a simplified membrane-module system by casting a unitary, tubular, reverse osmosis membrane in place, inside a stationary support module. Briefly our method consists of (1) placing an open pore module made of bonded, resin coated filler particles, having at least one circular bore through it, in a vertical position, (2) loading membrane casting solution, having a viscosity between about 1,000 and 100,000 cps., into each of the module bores, (3) gravity dropping a hydraulically stable, self-centering casting bob, having a circular cross-section at its widest point at a speed up to 1 inch/second down through the bore containing the casting solution to form a continuous film of casting solution on the inside of each module bore, the bores having an inside diameter between 0.02 and 0.12 inch greater than the diameter of the casting bob at its widest point, (4) exposing the cast in place film to air, (5) contacting the cast film with a suitable leaching liquid in such a manner and for a length of time necessary to produce a satisfactory reverse osmosis membrane, having an active osmotic skin, in each of the module bores and (6) optionally curing the cast in place membranes in water at temperatures up to 200° F.

Our method is particularly suitable for multiple bore modules and eliminates several process steps by casting the membranes in place.

BRIEF DESCRIPTION OF THE DRAWINGS

For a better understanding of the invention, reference may be made to the preferred embodiments, exemplary of the invention shown in the accompanying drawings in which.

DESCRIPTION OF THE PREFERRED EMBODIMENTS

Figure 1:
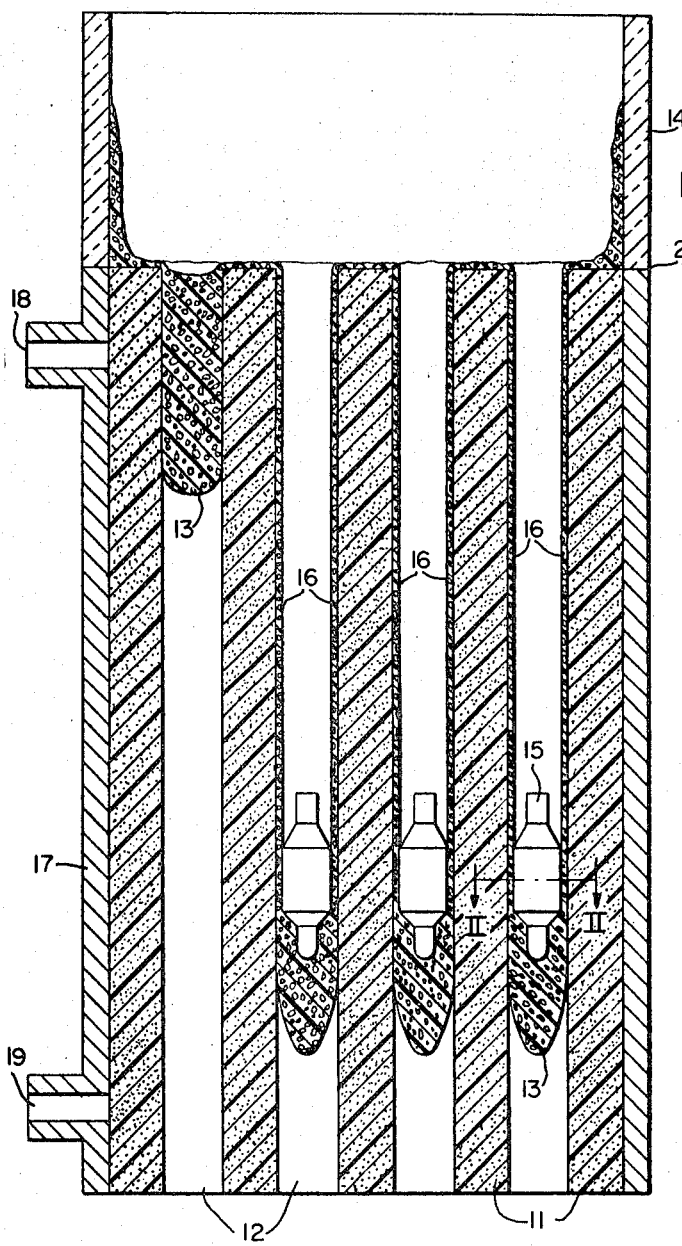
FIG. 1 shows a cross-sectional view of the membrane-module system with the reverse osmosis membrane being drop cast in the bores of an open pore module of bonded, resin coated filler particles.

Referring now to FIG. 1 of the drawings, an open pore support module 11, of bonded, resin coated filler particles, having a plurality of spaced circular feed bores 12, generally in an axial configuration on the module terminal end, is shown.

Membrane casting solution 13 may be poured into and through collar 14 attached to the end of the vertically positioned module, or the collar having a glass plate across the bottom and containing settled casting solution, may be placed on the module top terminal end and the plate removed. The casting solution may also be poured through collars inserted into each of the feed bores or inserted in the bores by a pressurized casting solution dispenser, as for example a grease gun. The initial placement of the casting solution is illustrated in one of the four bores shown in FIG. 1 before a casting bob is gravity dropped through it.

The casting solution fills the feed bores (between 30 and 100 ml. should be used per ½" dia., 4' long bore) and hydraulically stable casting bobs 15, having circular cross sections at their widest point, and generally round nosed front geometry are gravity dropped, round nosed front first, simultaneously through each bore containing the casting solution, to form the continuous cast in place films 16 as illustrated in three of the bores shown in FIG. 1. As can be seen, both the casting solution and the bobs are moving in the same downward direction. Also shown is an optional module reinforcement jacket 17 containing openings 18 and 19. The reinforcement jacket is generally made of thin metal or plastic and can be used as additional support for the module in high pressure operations.

The casting solutions used in the present invention contain leachable organic solvents and leachable pore producing swelling agents adapted to permit the structural organization of an osmotic skin from a film forming material by evaporation and leaching of the carrier solution.

The polymeric film forming material can be a cellulosic ether or cellulosic ester derivative such as cellulose acetate, cellulose acetate-butyrate, cellulose propionate or ethyl cellulose. Suitable leachable organic pore producing swelling agents can include triethyl phosphate, tetrahydrofurfuryl phosphate and substantially water soluble liquid amides such as formamide ($HCONH_2$), dimethyl formamide, methyl formamide or ethyl formamide. Suitable leachable organic solvents would include acetone, methyl ethyl ketone, ethyl alcohol and methyl alcohol.

These casting solutions are well known in the art, and reference may be made to U.S. 3,133,132 and 3,344,214 for further details on other compositions that can be used in this invention. They are viscous and generally range in viscosity from about 1,000 to 100,000 cps. at 25° C. Generally, the standard casting solution in the art containing 25 weight percent cellulose acetate, 30 weight percent formamide, 45 weight percent acetone and having a viscosity of about 20,000 cps. is used. Other ingredients may be included in the casting solution, however, to modify membrane characteristics to various degrees. Reference may be made to Modern Plastics, May 1968, pages 141-148 for detailed discussion and theory on the permselectivity of these cellulose acetate reverse osmosis membranes.

The porous support module 11 contains voids or pores between the resin coated filler particles allowing egress of pure water which has passed through the reverse osmosis membrane supported by the inside of each feed bore wall. A thin film of resin bonds each filler particle to the adjacent particles. The type and amount of resin used, the size of the filler particles and the wall thickness can be adjusted to give a considerable range in the strength and porosity of the resultant module.

The finely divided filler particles that can be used in the module may be spherical, oval, cubical, or of other irregular configuration. Some examples of suitable inorganic filler particles are foundry sand, silica, silicon carbide, zircon, quartz, alumina, beryl, glass, limestone, magnesium aluminum silicate, calcium silicate, sillimanite ($AL_2O_3 \cdot SiO_2$) or any other rigid filler with a granular structure that is compatible with the resin system it is used with. Especially suitable fillers for lightweight module construction are hollow spherical plastic or glass beads, ground pumic stone and the like.

The preferred average particle size range of fillers for use in the support module construction is between about 40 and 250 microns, although the outer limits are between about 30 and 500 microns. Below 30 microns, the resin-filler support module lacks the desired porosity for low resistance to water flow and above 500 microns the module bore wall does not properly support the membrane and may allow membrane puncture at high pressures.

The weight percent resin that can be used to coat the filler particles used to make the modules of this invention will vary depending upon the type filler, its fineness and density. For example, the weight percent resin will range from about 2 to 18 percent of the filler particle weight when foundry sand is used as the module filler constituent and 1 to 10 percent when zircon is used as the filler. The lightweight fillers will cause correspondingly higher weight percent resin values. On a volume basis the range would be about 4 to 32 percent resin for the filters enumerated. Above these ranges the resin will tend to clog up the pores between the filler particles in the tube causing poor effusion of the pure water. Below these ranges the support tube will not be strong enough for the pressures required in this water purification process.

A variety of resins can be used to coat the filler particles in the module, but phenolic resins are preferred because they can be bought cheaply and in readily usable form. Phenolic resins are well known in the art and are thoroughly discussed in Megson, Phenolic Resin Chemistry, Academic Press, 1958, particularly chapter 3. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde or furfuryl.

Other resins well known in the art which may be used as the coating and bonding agent in the resin bonded filler module include: polyglycidyl ethers (see Lee and Nevill, Handbook of Epoxy Resins, McGraw-Hill, 1966, particularly chapter 2), polyesters and allyl resins (see Bjorksten, Polyesters And Their Applications, Reinhold Publishing Corporation, 1956, pages 1-34), silicones and furane resins (see Brydson Plastic Materials, D. Van Nostrand Company, 1966, chapters 24 and 25), polyimide and polyamide-imide resins (see Frost and Bower, Aromatic Polyimides, J. Polymer Science, Part A, volume 1, 1963, 3135-3150 and U.S. Pats. 3,179,631; 3,179,632; 3,179,633 and 3,179,634 on polyimides and U.S. Pat. 3,179,635 on polyamide-imides).

The application of any liquid solution as a film to a particulate porous surface will result in the liquid solution being sucked into the pores due to capillary action. The degree to which this capillary action will thin the film is a function of the thickness of the solution initially placed on the surface, the size of the particles, resistance to flow of solution, surface tension between porous media and solution, and the time in which this capillary action is allowed to take place.

We found that successfully drop casting unitary reverse osmosis membranes in place, in support modules made of bonded, resin coated filler particles, required critical parameters as regards casting bob design tolerances, casting bob speed, filler particle size and filler to resin ratios in the modules.

Both the thickness of the fresh cast film and the time it is exposed to the capillary action are a function of casting bob design tolerances. The film thickness is controlled by the clearance between the widest point of the casting bob and the inside of the feed tube bore walls, whereas the film capillary exposure time is a function of the casting bob speed as it gravity drops through the viscous casting solution in the bore. The casting bob speed is controlled by the clearance between the casting bob and the feed bore sides, the length of the widest portion of the bob, the weight of the bob, the quantity of casting solution pushed ahead of the bob and the casting solution viscosity.

We found that smooth uniform membranes resulted with a casting bob having a hydraulically stable self-centering geometry, with a round cross-section at its widest point having an outer diameter between 0.02 and 0.12 inch less than the inside diameter of the module bore i.e. the inside diameter of the module bore must be between 0.02 and 0.12 inch greater than the diameter of the casting bob at its widest point. A clearance greater than 0.12 inch left a solution film so thick that it began to flow after the casting bob had passed, leaving an uneven surface. A clearance less than 0.02 inch exposed sand particles in some places, leaving a non-continuous membrane. The preferred casting bob dimensional range for use in this invention is an outer bob diameter 0.03 to 0.06 inch smaller than the inner diameter of the module bore. We found that even if the module bore was not completely circular, that these tolerances between outer bob diameter and the closest inner bore surfaces produced excellent membranes, the surface tension of the casting solution making the film conform to the bore geometry.

Figure 2:
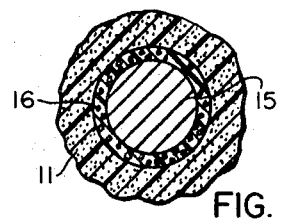
FIG. 2 shows a cross section of the casting bob and support module bore of the membrane-module system of FIG. 1, taken along the line 2—2.

As shown in FIG. 2, a cross-section along line 2—2 in FIG. 1, the film is batch cast in the annulus between the inside surface of the support module bore and the widest circular surface of the casting bob as the bob drops down through the bore containing the casting solution and through the casting solution pushing the casting solution in front of it and around it. The film thickness will be approximately one-half the difference between the inner diameter of the support module bore and the outer diameter of the widest point of the casting bob.

Casting bob speeds greater than about 0.325 inch/sec. for modules having a particle size range between about 40 and 350 microns and ½ inch bores, resulted in the casting bob pushing excess amounts of casting solution into the sand feed bore walls. This excess casting solution would then ooze out of the sand after the bob had passed, tending to give an uneven membrane surface. For modules having ½ inch bores and smaller filler particles, ranging between 40 and 100 microns, with resulting smoother bore surfaces, casting bob speeds up to 1 inch/second are possible and will produce excellent membranes. Preferred casting bob velocities were between about 0.20 to 0.30 inch/sec., for modules having about ½ inch bores made of resin coated sand.

We found that a casting bob having a round-nosed front geometry gave about twice the speed as a flat-nosed bob of the same weight. The hydraulically stable casting bob design, which we used to cast ½ inch diameter membranes, consisted of a 2 ounce, three inch long, one quarter inch diameter tungsten rod having a round-nosed front sheathed with a circular stainless steel midsection. The casting bob should weigh between about 1.5 and 2.5 ounces in order to give satisfactory results with casting solutions of about 15,000 to 30,000 cps. The casting bob weight necessary to achieve a satisfactory membrane was found to be a function of the diameter of the membrane to be cast and the design of the casting bob. For membranes substantially larger or smaller than ½" diameter the weight of the bob can be varied to provide the bob speed necessary to produce satisfactory membranes.

We found that the module bores may, as a preliminary step, and during the casting operation be saturated with acetone or other organic solvent which may be used in the casting solution formulations. This helps to reduce the rate of solvent evaporation and dry out during the casting operation. The solvent can be poured into the bores to effect this result or the casting bob can be dipped in solvent before being dropped through the bores. This step is not necessary, however, to give satisfactory membranes.

At the end of a run the excess casting solution and the casting bob can be caught in a reservoir of casting solution. Afterwards, air can be circulated slowly past the freshly cast membrane for about 10 to 150 seconds, after which the module, with the membranes within the bore walls, is immersed in a leaching bath which may contain water, water-organic or other suitable leaching liquid at a temperature of between about 32 to 38° F. It is advisable to leach the membranes within about 7 minutes from the beginning of the run, to prevent membrane dry-out. The module must be continuously lowered into the bath in order to produce a uniform membrane surface. It is also advisable to close jacket opening 19 shown in FIG. 1, and attach an air hose to opening 18 leading out of the leaching bath, so that there is no chance of water pressure collapsing the membranes near the top terminal end 20 of the module. The module is left in the leaching bath between about 20 to 90 minutes. During this time the formamide and acetone are leached from the film by the ice water, the film shrinks in thickness and forms a thin active osmotic skin on the porous membrane structure. The membrane, if it is properly cast, remains intact, adhering strongly to the porous sand module feed bore walls. The membrane may then be cured by immersing the module in a hot water bath at temperatures up to 200° F.

We found that 100% reliability could be achieved if the cast module terminal ends have no rough edges, the loose sand in each sand module bore is blown out with compresesd air and the terminal ends are sealed with a suitable polymeric materials such as an epoxy resin. We found that we could reduce the possibility of air bubbles forming in the cast film as the bob pushes through the casting solution in the porous module bores by letting the freshly prepared casting solution sit in an open container for 24 hours, to outgas it, before placing it in the module bores.

Figure 3:
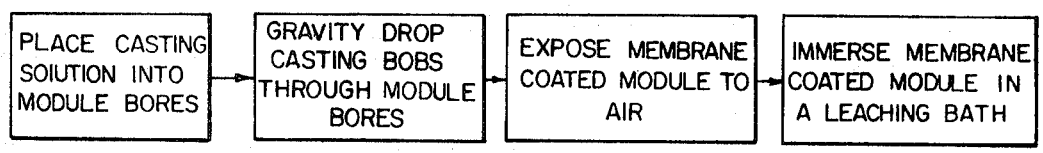
FIG. 3 shows a flow diagram of the method of this invention.

Our method has the advantages of eliminating the costly, time consuming and very complicated step of inserting already cast tubular reverse osmosis membranes into their support structures in a reverse osmosis apparatus. Our method shown in diagram form in FIG. 3 and illustrated in the specific example below, produces excellent cast in place reverse osmosis membranes.

EXAMPLE I

A membrane casting solution based on cellulose acetate with a leachable solvent and swelling agent was prepared by mixing 5 oz. of cellulose acetate (Eastman Grade E–398–10), 9 oz. of acetone and 6 oz. of formamide swelling agent. This casting solution had a viscosity of about 20,000 cps. at 25° C.

A 4 foot long 3.75 inch diameter sand module, having 18 axially disposed, circular feed bores and contained within a ⅛ inch thick stainless steel jacket, was used as the membrane support. The module was composed of foundry sand having an average particle size of about 150 microns which was resin coated and bonded together by a phenolic resin having a viscosity at 25° C. of 4200 cp. and a solids content at 135° C. of 67% (sold commercially by Hooker Chemical Corporation under the trade name Durez Phenolic Resin 18115). The weight percent resin was about 6 percent of the filler particle weight. The terminal ends of the sand module were filed flat and loose sand in the bores blown out with compressed air. The module was saturated with solvent by squirting a very small amount of acetone down the bores while the module was placed in a stationary vertical position.

A glass container with about 350 ml. of the casting solution (50 ml. used per bore) was placed on the top of the module. The container had a flat plate bottom which was removed and the casting solution poured into the module bores. After the viscous casting solution had dropped down into the feed bores within the sand module, an acetone wet casting bob was simultaneously dropped round-nosed front first down through each feed bore, and through the casting solution, pushing the casting solution in front of it and around it in the annulus between the bore wall and bob, leaving behind a film of casting solution about 20 mils (0.020") thick, adhering to the feed bore walls. The excess solution and the casting bobs were caught in a casting solution reservoir. The casting run took approximately 3.5 to 4 minutes.

The inside diameter of the feed bores was 0.50 inch. The casting bob was made from a three inch long, one quarter inch diameter tungsten rod. The rod having a round-nosed front was sheathed with a stainless steed mid-section 0.438 inch in diameter at its widest point. The mid-section was 1.25 inches long where it was attached to the rod and 0.125 inch long at the 0.438 maximum diameter (widest point of the casting bob). This casting bob had an outside diameter 0.062 inch smaller than the inside diameter of the feed bores and weighed approximately 2 oz. The casting bob velocities ranged from 0.243 to 0.291 inch/sec. with the average being 0.273 inch/sec. Gravity was the sole downward force involved in casting and the casting bobs were designed to give the optimum velocity through the casting solution for optimum film casing in the sand module environment.

The sand module with the cast film in each of the feed bores was allowed to air dry for about 30 seconds during transport to the leaching bath. It was then immersed by continuously lowering it into a leaching bath containing ice water at 34° F. for 30 minutes. This leached the acetone and formamide from the cast film and formed unitary, porous, reverse osmosis membranes, containing a thin active osmotic skin on the outside of the membrane structure, in each of the bores. The initial film thickness was only about 20 mils (0.020″), due to casting solution penetration into the porous resin coated feed bore walls. During leaching, the membranes shrank to their final thickness of about 8 mils (0.008″). They were firmly attached and did not separate from the feed bore walls during leaching, due to the impregnation of the sand walls during the casting operation. The cast in place membranes were smooth and uniform.

The jacketed sand modules containing these cast in place reverse osmosis membranes were placed in a hot water bath at 180° F. to cure the membranes and then tested on a brackish water feed containing 2,000 p.p.m. salt (NaCl) at 200 p.s.i.g. Results showed 12 gallons per day per square foot membrane surface (g.g.d./ft.²) pure water flux at a 90% salt rejection rate.

We claim as our invention:

1. A method of casting unitary, tubular reverse osmosis membranes in place in the feed bores of an open pore module of resin bonded, resin coated granular filler particles, comprising the steps:
   (1) placing a module comprising resin bonded, resin coated granular filler particles in a stationary vertical position,
   (2) placing a casting solution, having a viscosity between about 1,000 and 100,000 cps. at 25° C., comprising a polymeric film forming material selected from the group consisting of cellulosic ethers and cellulosic esters, a leachable organic solvent and a leachable organic pore producing swelling agent into each of the bores within the module,
   (3) gravity dropping a casting bob having a hydraulically stable geometry and a circular cross-section at its widest point down through the bore containing the casting solution to form a continuous film of casting solution on the inside of each bore, said bore having an inside diameter between 0.02 and 0.12 inch greater than the diameter of the bob at its widest point,
   (4) exposing the cast film to air, and
   (5) contacting the film with a leaching liquid to form a reverse osmosis membrane on the inside of each module bore.

2. The method of claim 1 wherein the film forming material is selected from the group consisting of cellulose acetate, cellulose acetate butyrate, cellulose propionate and ethyl cellulose, the organic solvent is selected from the group consisting of acetone, methyl ethyl ketone, ethyl alcohol and methyl alcohol and the swelling agent is selected from the group consisting of triethyl phosphate, tetrahydrofurfuryl phosphate and a substantially water soluble amide selected from the group consisting of formamide, dimethyl formamide, methyl formamide and ethyl formamide.

3. The method of claim 2 wherein the resin coating the filler particles is selected from the group consisting of phenolics, polyglycidyl ethers, polyesters, silicones, polystyrenes, polyimides, polyamide-imides, allyl resins and furane resins.

4. The method of claim 3 wherein the casting bob is gravity dropped at a speed of up to 1 inch/second and the open pore module comprises filler particles having an average particle size range between about 40 and 100 microns.

5. The method of claim 3 wherein the casting bob is gravity dropped at a speed up to about 0.325 inch/second and the open pore module comprises filler particles having an average particle size range between about 30 and 500 microns.

6. The method of claim 3 wherein the casting bob is gravity dropped at a speed up to about 0.325 inch/second and the open pore module comprises filler particles having an average particle size range between about 40 and 350 microns.

7. The method of claim 6 wherein the bores are saturated with an organic solvent before placing casting solution in the bores.

8. The method of claim 6 wherein the film is contacted with a leaching liquid by immersing the module by continuously lowering it into a leaching bath containing water at between about 32 to 38° F.

9. The method of claim 6 wherein, as a last step, the module is immersed in a hot water bath at a temperature up to 200° F.

10. The method of claim 6 wherein the casting solution comprises cellulose acetate acetone and formamide, and the open pore module comprises resin coated foundry sand particles with a weight-percent range from about 2 to 18 percent of the sand particle weight.

11. The method of claim 10 wherein the casting solution has a viscosity between about 15,000 and 30,000 cps., the bore diameters are about ½ inch, and the casting bob weights between about 1.5 and 2.5 ounces.

12. The method of claim 11 wherein the casting bob is gravity dropped at a speed between about 0.20 and 0.30 inch/second and the casting bob has a round-nosed front geometry.

13. A method of casting unitary, tubular reverse osmosis membranes in place in the feed bores of a porous module of resin bonded, resin coated filler particles, comprising the steps of:
   (1) placing the module comprising resin bonded, resin coated filler particles in a stationary vertical position,
   (2) placing a casting solution, having a viscosity between about 1,000 and 100,000 cps. at 25° C., comprising a cellulosic derivative, a leachable organic solvent and a leachable organic pore producing swelling agent into each of the bores within the module, and
   (3) gravity dropping a casting bob having a hydraulically stable geometry and a circular cross-section at its widest point down through the bore containing the casting solution to form a continuous film of casting solution on the inside of each bore, said bore having an inside diameter between 0.02 and 0.12 inch greater than the diameter of the bob at its widest point.

14. The method of claim 13 wherein the porous module comprises inorganic particles having an average particle size between about 30 and 500 microns and having a resinous film deposited thereon, said resinous film constituting about 4 to 32 volume percent of the porous module, the casting solution has a viscosity between about 15,000 and 30,000 cps. at 25° C., the casting bob is gravity dropped at a speed up to about 0.325 inch/second, and as a last step the continuous film of casting solution is contacted with a leaching liquid to form a reverse osmosis membrane on the inside of each module bore.

References Cited

UNITED STATES PATENTS

| | | | |
|---|---|---|---|
| 3,133,132 | 5/1964 | Loeb et al. | 264—49 |
| 3,341,024 | 9/1967 | Lowe et al. | 264—49 X |
| 3,446,359 | 5/1969 | Loeb et al. | 264—49 X |
| 3,457,170 | 7/1969 | Havens | 210—500 X |

FOREIGN PATENTS

| | | | |
|---|---|---|---|
| 367,948 | 3/1932 | Great Britain | 25—38 |
| 547,820 | 9/1942 | Great Britain | 117—95 |
| 551,454 | 2/1943 | Great Britain | 117—95 |

OTHER REFERENCES

U.S. Office of Saline Water, "Design and Construction of a Desalination Plant (A Reverse Osmosis Process). Research and Development Report No. 86, by Aerojet-central. January 1964, pp. 4–8; 13.

PHILIP E. ANDERSON, Primary Examiner

U.S. Cl. X.R.

117—8, 95, 98, DIG. 9; 210—500; 264—41, 217, 269